US006690141B1

United States Patent
Yu

(10) Patent No.: US 6,690,141 B1
(45) Date of Patent: Feb. 10, 2004

(54) MULTI-FUNCTIONAL CHARGER WITH POWER GENERATING AND ILLUMINATION FUNCTIONS

(76) Inventor: Yung-Chia Yu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/233,828

(22) Filed: Sep. 3, 2002

(51) Int. Cl.⁷ .............................................. H01M 10/46
(52) U.S. Cl. ..................................................... 320/107
(58) Field of Search .............................. 320/101, 107, 320/112, 113, 114, 115; 310/80, 83, 75 R, 67 A, 67 R; 290/1 C

(56) References Cited

U.S. PATENT DOCUMENTS 4,105,314 A * 8/1978 Hughes, Jr.
4,227,092 A * 10/1980 Campagnuolo et al.

* cited by examiner

Primary Examiner—Edward H. Tso

(57) ABSTRACT

A multi-functional charger with power generating and illumination functions comprises a device body, a gear set, a generator, a voltage and current control loop, a battery, and a movable rod. When the movable rod rotates, the generator will operate by the driving of the gear set so as to generate a current. The current is suppressed, rectified and regulated by the voltage and current control loop. It can be determined to be stored in the battery or outputted through a plug by the switching of the switch. The power stored in the battery can be supplied to the LED lamp or to be outputted. When the power is outputted, a plug serves to be connected to an electric device to be charged. To achieve the requirement of illumination, the generator is connected to an external bulb set. Thereby, the charger can be used in various applications.

5 Claims, 7 Drawing Sheets

MULTI-FUNCTIONAL CHARGER WITH POWER GENERATING AND ILLUMINATION FUNCTIONS

FIELD OF THE INVENTION

The present invention relates to power charger, and particularly to multi-functional charger with power generating and illumination functions.

BACKGROUND OF THE INVENTION

In the current modern life, electric devices are used frequently, almost everybody needs to use electric devices in the daily life. Such devices are for example notebook computers, mobile phones, portable audio recorders, etc. However, in general, these devices are portable and thus are necessary to be charged by a charger. In general, the charger is lack of a generator. Thereby, the charger must be connected to a power source for receiving power and then charges the power to these devices. Thereby, the prior art charger has no illuminating lamp and thus it is inconveniently for being used in the dark.

SUMMARY OF THE INVENTION

Accordingly, the primary object of the present invention is to provide a multi-functional charger with power generating and illumination functions. The charger comprises a device body, a gear set, a generator, a voltage and current control loop, a battery, and a movable rod. When the movable rod rotates, the generator will operate by the driving of the gear set so as to generate a current. The current is suppressed, rectified and regulated by the voltage and current control loop. It can be determined to be stored in the battery or outputted through a plug by the switching of the switch. The power stored in the battery can be supplied to the LED lamp or to be outputted. When the power is outputted, a plug serves to be connected to an electric device to be charged. Or to achieve the requirement of illumination, it is connected to an external bulb set. Thereby, the present invention can be used in various applications.

The various objects and advantages of the present invention will be more readily understood from the following detailed description when read in conjunction with the appended drawing.

DETAILED DESCRIPTION OF THE PREFERRED EMBODIMENTS

Figure 1:
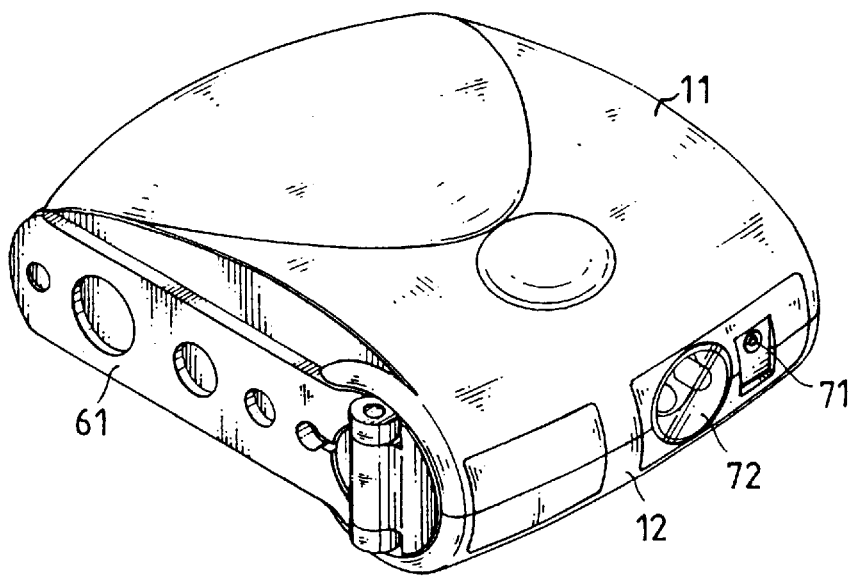
FIG. 1 is an assembled perspective view of the present invention.
Figure 2:
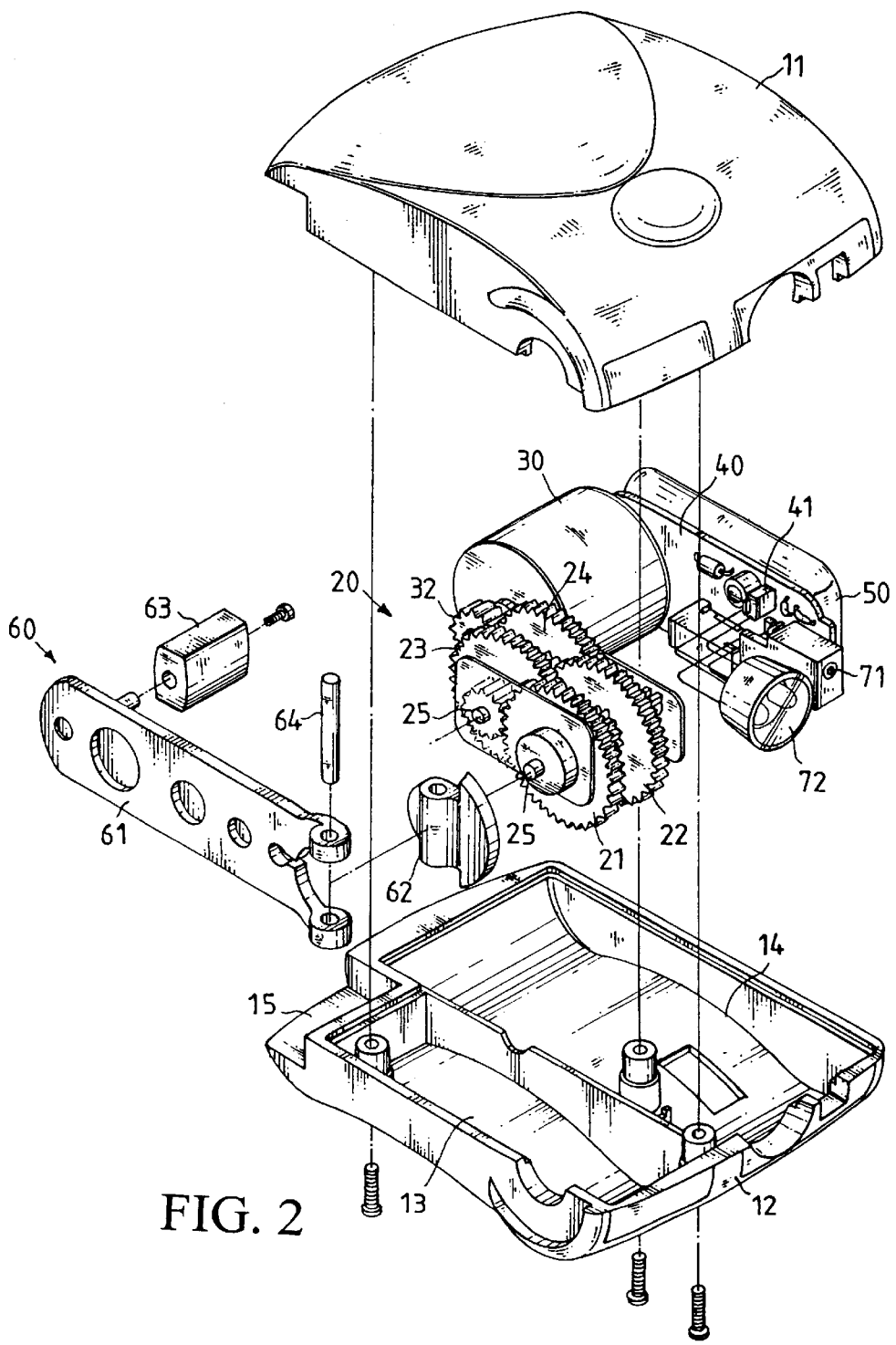
FIG. 2 is an exploded perspective view of the present invention.
Figure 3:
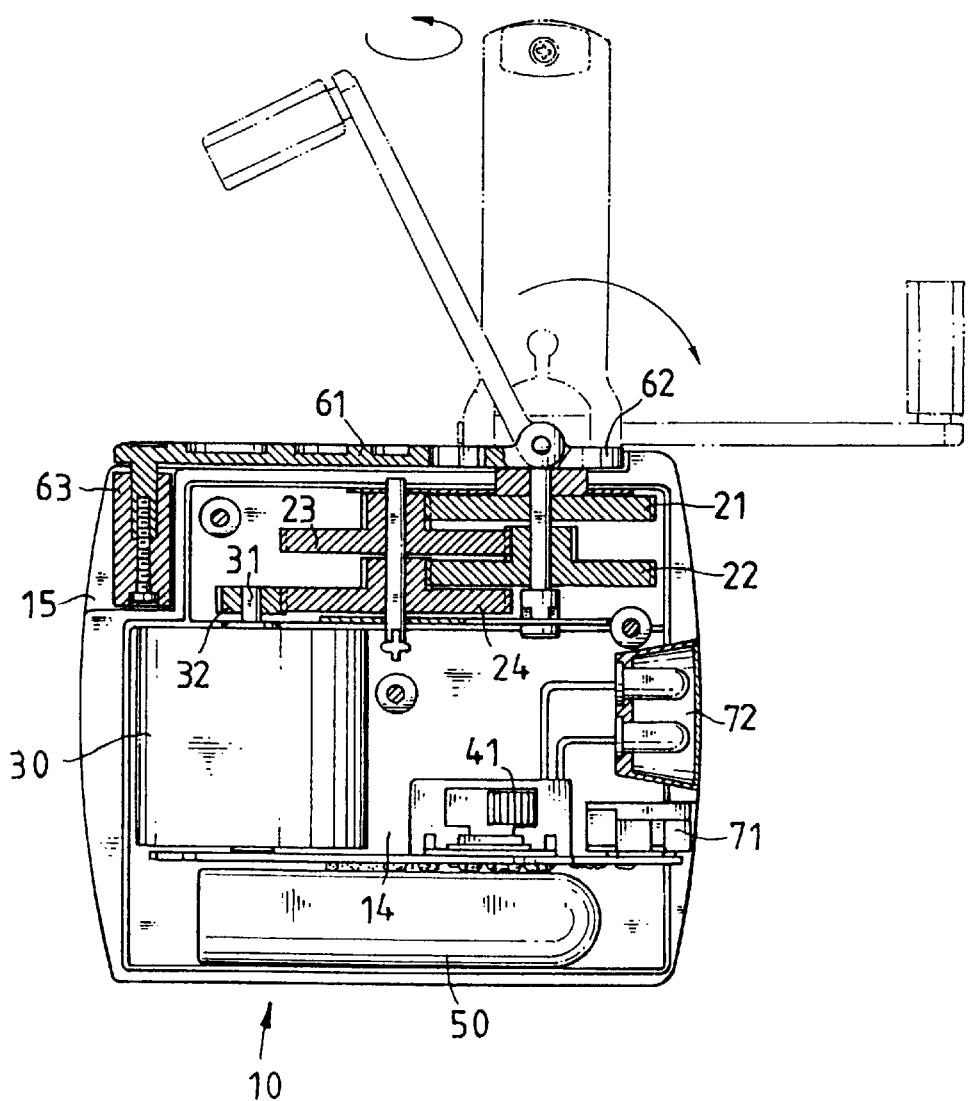
FIG. 3 is a cross sectional view of the present invention.

Referring to FIGS. 1 and 3, the multi-functional charger with power generating and illumination functions of the present invention is illustrated. The multi-functional charger with power generating and illumination functions includes a device body 10, a gear set 20, a generator 30, a voltage and current control loop 40, a battery 50, and a movable rod 60.

The device body 10 is formed by an upper casing 11 and a lower casing 12. The inner edge thereof is formed with a first receiving space 13, a second receiving space 14, and a third receiving space 15 for receiving the gear set 20, the generator 30, the voltage and current control loop 40 and the battery 50.

The gear set 20 includes a first gear 21, a second gear 22, a third gear 23, and a fourth gear 24. Two pivot rods 25, 25' pass through the gears 21, 22, 23 and 24 to be pivoted to a front end of the first receiving space 13 of the device body 10. One pivot rod 25 passes through the first and second gears, 21 and 22, and another pivot rod 25' passes through the third and fourth gears 23 and 24. The gears 21, 22, 23 and 24 are alternatively arranged so as to form a driving system. One outer lateral side of the gear set 20 is pivoted to the movable rod 60. By rotating the movable rod 60, the gear set 20 is driven to rotate.

The generator 30 is a smaller type generator which is installed at a rear side of the second receiving space 14 of the device body 10. One side of the generator 30 has a driving shaft 31. A driving gear 32 is engaged to the driving shaft 31. The driving gear 32 is engaged to one end of the gear set 20. Thereby, the generator 30 can be driven to generate power by the gear set 20.

The voltage and current control loop 40 is an IC circuit board which convert the AC current from the generator 30 to DC current. The voltage and current control loop 40, an output portion 71 and an LED light are placed at a front end of the second receiving space 14 of the device body 10. The voltage and current control loop 40 is electrically connected to the generator 30. Thereby, the voltage and current control loop 40 is also connected to the battery 50, output portion 71, and LED light 72. Other than storing the power generating by the generator 30, power generated by the generator 30 can be outputted to outer elements, or to the LED light 72. A control switch 41 in the voltage and current control loop 40 is used to control the power storage or output.

The battery 50 is received in the second receiving space 14 of the device body 10. The battery 50 is a component for storing power from the generator 30.

Figure 4:
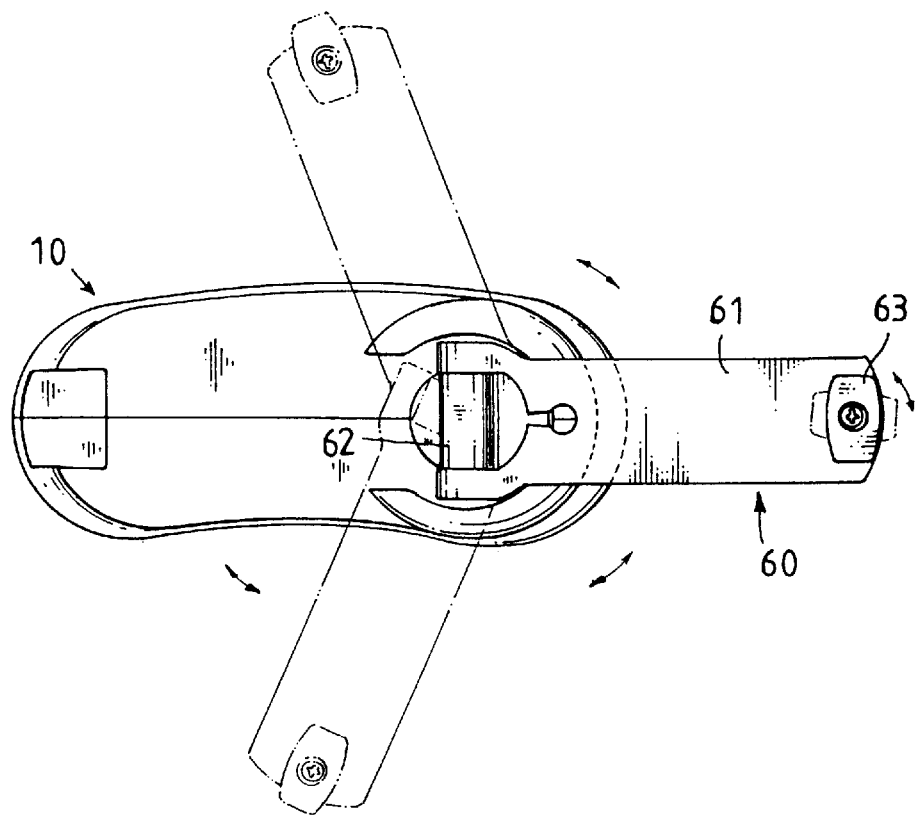
FIG. 4 is a schematic view showing the storage of power according to the present invention.

The movable rod 60 is installed at one lateral side of the device body 10. The movable rod 60 is formed by a body 61, a pivot rod 62 and a handle 63. The body 61 has an Y shape. One end of the body 61 is pivotally connected to the device body 10 by a pin 64. The pivot rod 62 is coupled at one lateral side of the device body 10. The pivot rod 62 can rotate through 180 degrees. The handle 63 at another side of the body 61 can be received in the third receiving space 15 of the body 10 so as to present a beautiful outlook and to be carried conveniently (referring to FIG. 4). It should by noted that when the pivot rod 62 is firmly secured to the device body 10, it is connected to one end of the gear set 20 so that the movable rod 60 can drive the gear set 20 to rotate.

Figure 5:
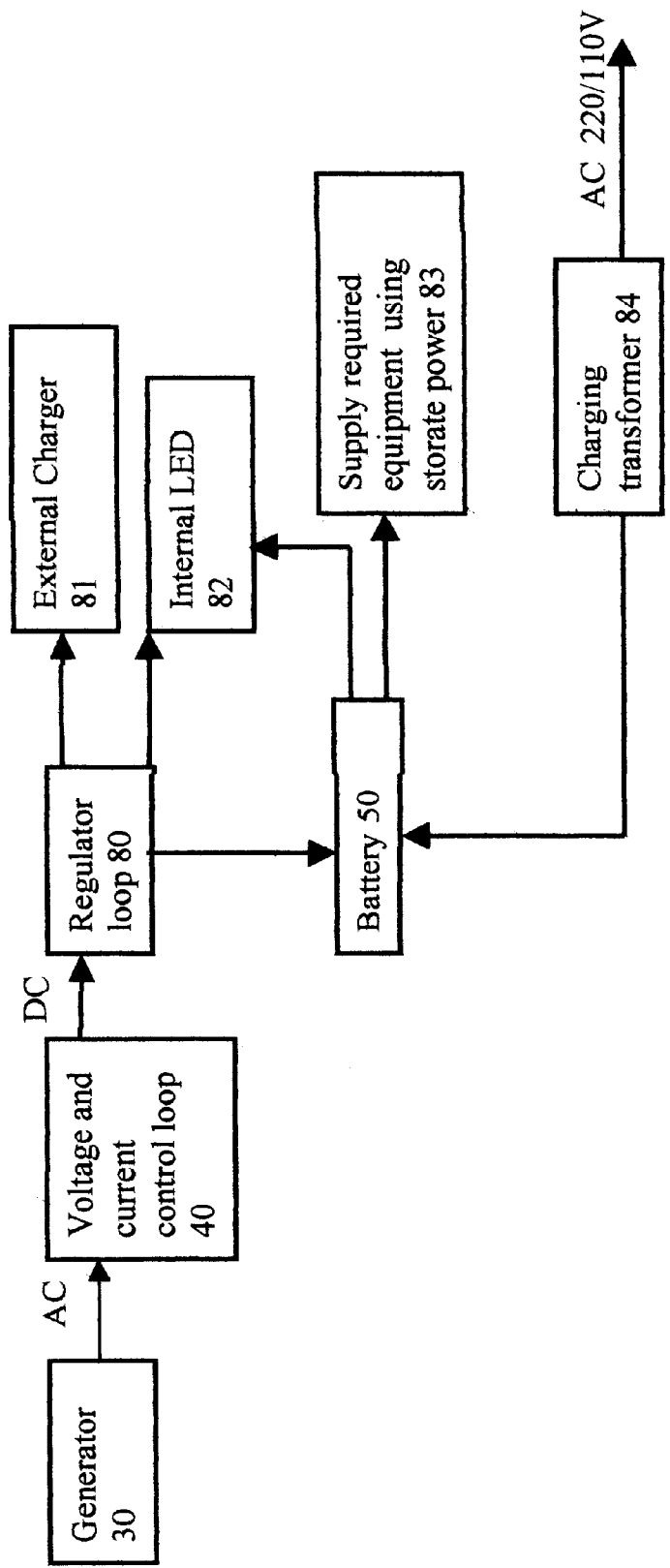
FIG. 5 is a block diagram showing the function and process of the present invention.

Referring to FIG. 5, a block diagram for illustrating the present invention is illustrated. When the movable rod 60 rotates, the generator 30 will operate by the driving of the gear set 20 so as to generator a current. The current is suppressed, rectified and regulated by the voltage and current control loop 40. Then the current flow to a regulator loop 80. Then the power can be outputted to an external charger 81 or internal LEDs 82 or to a charger 50 for further supply to other required equipment 83 or to a charging transformer 84.

Figure 6:
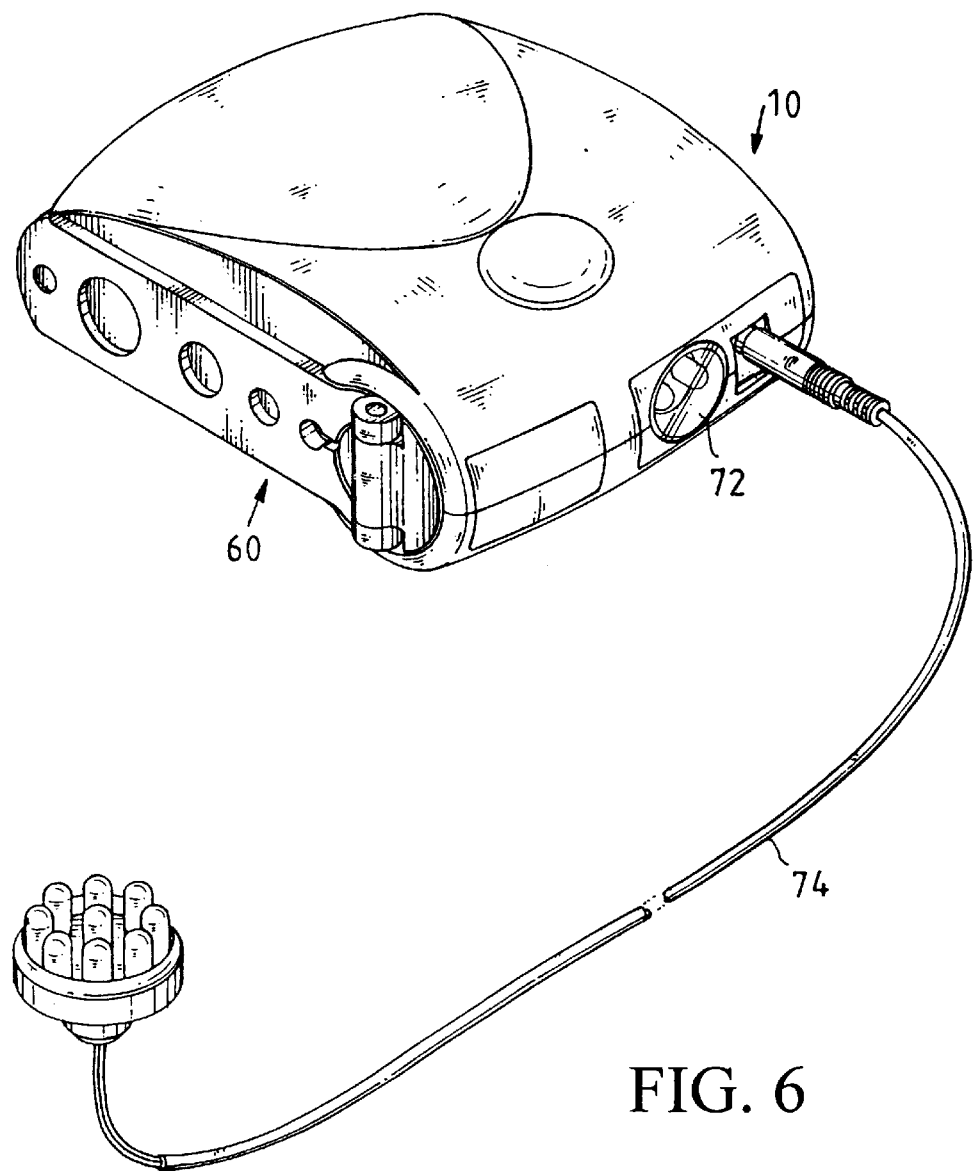
FIG. 6 is a schematic view showing one embodiment about the illumination of the present invention.
Figure 7:
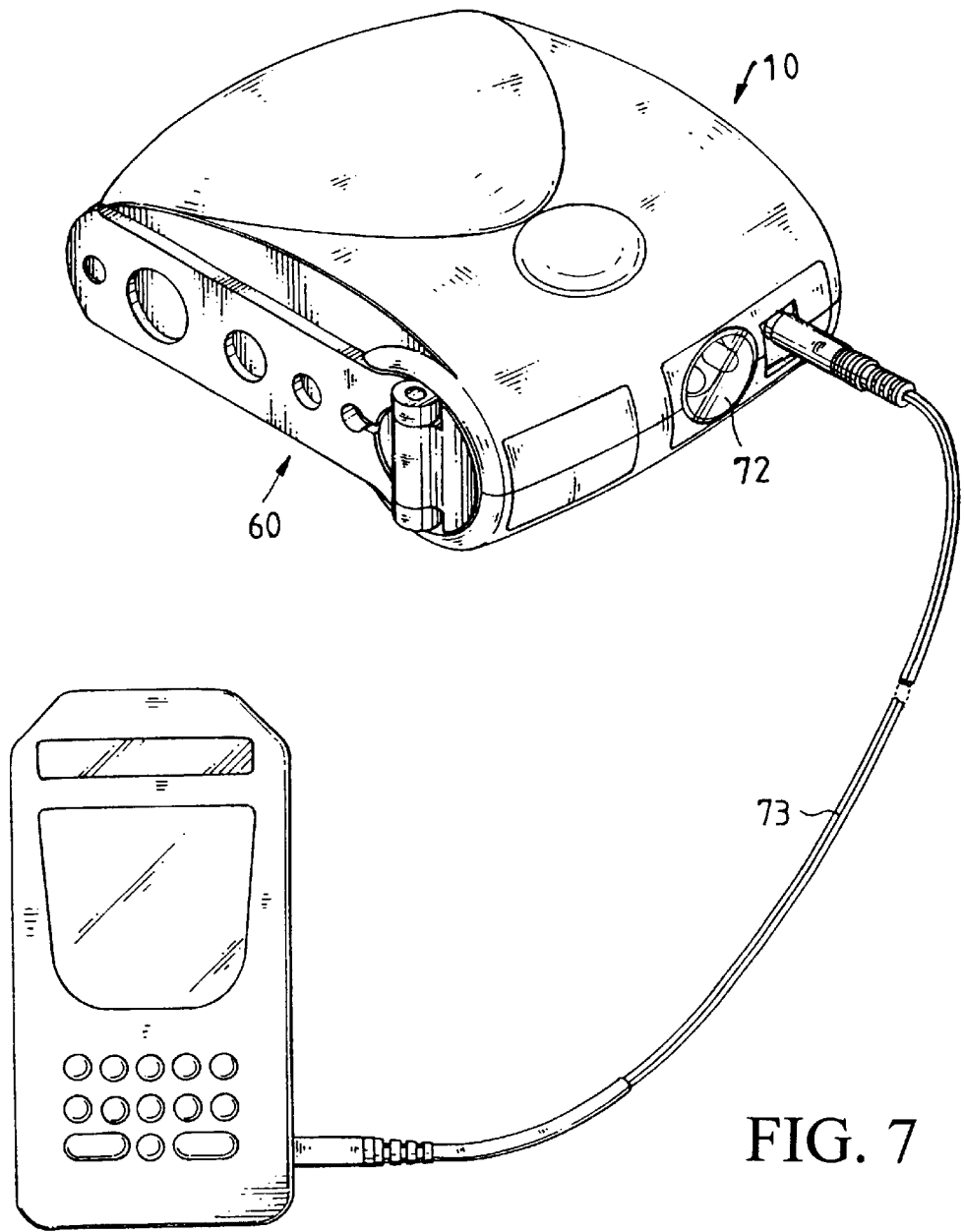
FIG. 7 is a schematic view showing power output way in the present invention.

As illustrated in FIGS. 6 and 7, in another embodiment, the power of the current can be stored in the battery 50 or outputted through a plug 73 by switching the switch 41. The power stored in the battery 50 can be supplied to the LED lamp 72 or to be outputted. When the power is outputted, a plug 73 serves to be connected to an electric device to be charged. Moreover, to achieve the requirement of illumination, it is connected to an external bulb set 74. Thereby, the present invention can be used in various application.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-functional charger with power generating and illumination functions comprising a device body, a gear set, a generator, a voltage and current control loop, a battery, and a movable rod; wherein the device body is formed by an upper casing and a lower casing; an inner edge of the device body is formed with a plurality of receiving spaces for receiving the gear set, the generator, the voltage and current control loop and the battery;

the gear set includes a first gear, a second gear, a third gear, and a fourth gear; two pivotal rods pass through the gears to be pivoted to one receiving space of the device body; each first pivot rod passes through the two different gears; the four gears are alternatively arranged so as to form a driving system; one outer lateral side of the gear set is pivoted to the movable rod;

the generator is installed in the device body and one side of the gear set opposite to the side of the gear set is installed with the movable rod; another end of the generator has a driving shaft; a driving gear is engaged to the driving shaft; the driving gear is engaged to one end of the gear set; thereby, the generator is driven to generate power by the gear set; and the voltage and current control loop is an IC circuit board which convert AC current from the generator to DC current; one end of the voltage and current control loop is connected to a battery for storing power from the generator and another end of the voltage and current control loop is connected to an output portion for outputting the power, or is connected to an LED for illumination.

2. The multi-functional charger with power generating and illumination functions as claimed in claim 1, wherein a movable rod is, formed by a body, a second pivot rod and a handle; one end of the body is pivotally connected to the device body by a pin and capable of rotating through 180 degrees; and the handle at another side of the body is received in the device body.

3. The multi-functional charger with power generating and illumination functions as claimed in claim 1, further comprising a control switch which is connected to the voltage and current control loop for controlling the current generated by the generator to be stored in the battery or to be outputted.

4. The multi-functional charger with power generating and illumination functions as claimed in claim 1, wherein the output portion is connected to an electric device through a plug so as to charge power to the electric device.

5. The multi-functional charger with power generating and illumination functions as claimed in claim 4, wherein the electric device is selected from one of a group containing handset, a portable audio device, and a notebook.

* * * * *